March 6, 1928.

G. R. McDONALD

REGULATING SYSTEM

Filed Aug. 30, 1926

1,661,841

Inventor:
Gordon R. McDonald,
by
His Attorney.

Patented Mar. 6, 1928.

1,661,841

UNITED STATES PATENT OFFICE.

GORDON R. McDONALD, OF SCHENECTADY, NEW YORK, ASSIGNOR TO GENERAL ELECTRIC COMPANY, A CORPORATION OF NEW YORK.

REGULATING SYSTEM.

Application filed August 30, 1926. Serial No. 132,370.

My invention relates to regulating systems, and particularly to regulating systems for controlling the division of load between two sources of current, and its object is to provide a system for accomplishing this result employing electron discharge devices.

My invention will be better understood from the following description, taken in connection with the accompanying drawing, and its scope will be pointed out in the appended claims.

Figure 1:
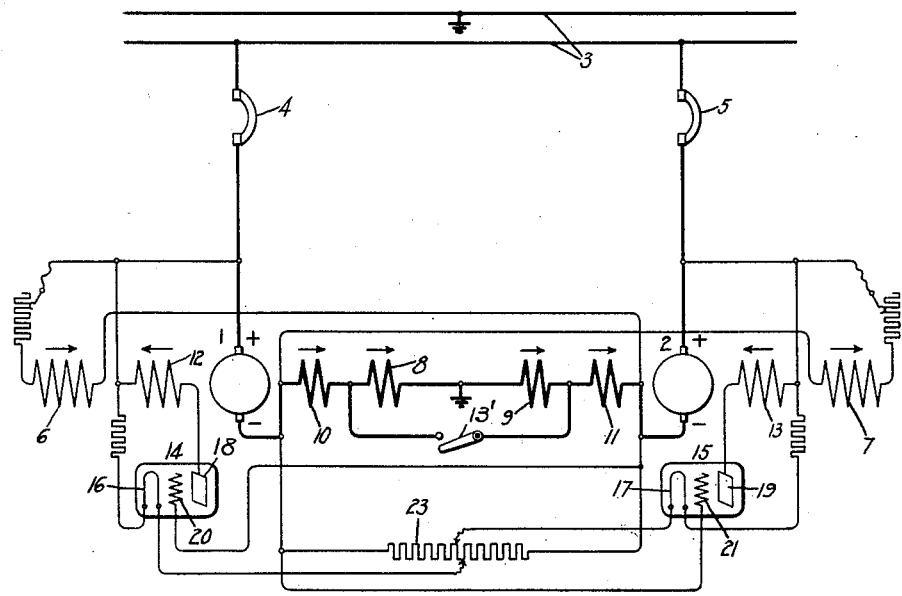
Figure 2:
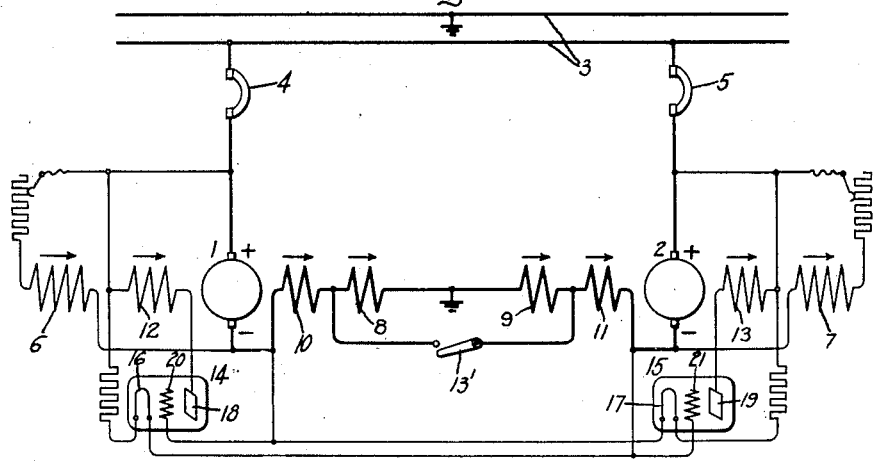

In the accompanying drawing, Fig. 1 is a diagram of two parallel direct current generators embodying my invention, and Fig. 2 is a modification thereof.

Referring to Fig. 1, 1 and 2 represent sources of current, shown as compound direct current generators, which are adapted to be connected to a common load circuit 3 by current breakers 4 and 5 respectively, which may be of any suitable type, examples of which are well known in the art.

The generators 1 and 2 are provided with cross connected field windings 6 and 7, series field windings 8 and 9, series commutating field windings 10 and 11, and differentially wound auxiliary field windings 12 and 13 respectively.

13' represents any suitable switching means which, when closed, completes an equalizing connection between the two series field windings 8 and 9, so that substantially equal currents flow through them.

In order to maintain a predetermined division of the load between the two generators 1 and 2, the currents through the differentially wound auxiliary field windings are respectively controlled by the electron discharge devices 14 and 15 which are arranged in any suitable manner so the current transmitted through the tubes varies in accordance with the relative current outputs of the two generators. As shown, the devices 14 and 15 are respectively provided with cathodes 16 and 17, anodes 18 and 19, and controlling electrodes 20 and 21. In order that the device 14 may operate to increase the current through the differential field winding 12 and thereby decrease the voltage thereof when the machine 1 is supplying more than its share of the load, the cathode 16 and the controlling electrode 20 are connected so that they have impressed thereon voltages which vary in accordance with the currents supplied by the machines 1 and 2 respectively. This result is obtained, in the arrangement shown, by connecting the controlling electrode 20 to the negative terminal of the series commutating field winding 11 and by connecting the cathode 16 between the positive terminal of the generator 1 and a point on a resistor 23 which connects together the negative terminals of the commutating field windings 10 and 11 so that the voltage impressed thereon varies in accordance with the voltage drop across commutating winding 10. Consequently when the generator 1 is supplying more than its share of the load, the device 14 operates to increase the current through the differential field winding 12 and thereby decrease the load on the generator 1 because the greater current through the field winding 10 causes the controlling electrode 20 to become more positive with respect to the cathode 16.

The controlling electrode 21 of the device 15 is connected in a similar manner to the negative terminal of the series commutating field winding 10 of the generator 1 and the cathode 17 is connected between the positive terminal of the generator 2 and a point on the resistor 23 so that the voltage impressed thereon varies in accordance with the voltage drop across the commutating winding 11. Consequently, when the generator 2 is supplying more than its share of the load, the device 15 operates to increase the current through the differential field winding 13 and thereby decrease the load on the generator 2 because the greater current through the field winding 11 causes the controlling electrode 21 to become more positive with respect to the cathode 17.

The operation of the regulating system shown is as follows: So long as each generator is supplying its proper share of the total load, the voltage drop across the series commutating field windings, which act as impedances in the circuit of the generators, are equal and therefore the voltages impressed upon the controlling electrodes 20 and 21 are the same with respect to each other and also with respect to their respective cathodes 16 and 17. Therefore, the currents through the regulating field windings 12 and 13 are substantially the same.

If the load on the generator 1 increases with respect to the load on the generator 2, the voltage drop across the field winding 10 becomes greater than the voltage drop across the field winding 11. Consequently, the controlling electrode 20 becomes more positive with respect to its cathode 16 so that more current is transmitted through the device 14, and the controlling electrode 21 becomes more negative with respect to its cathode 17 so that less current is transmitted through the device 15. Therefore, the current through the differential field winding 12 is increased so as to decrease the current output of the generator 1 and the current through the differential field winding 13 is decreased so as to increase the current output of the generator 2 and thereby restore the proper load division between the generators.

If the load on the generator 2 increases with respect to the load on the generator 1, the voltage drop across the field winding 11 becomes greater than the voltage drop across the field winding 10. Consequently, the controlling electrode 21 becomes more positive with respect to its cathode 17, so that more current is transmitted through the device 15, which effects a decrease in the current output of the generator 2 and the controlling electrode 20 becomes more negative with respect to its cathode 16 so that less current is transmitted through the device 14, which effects an increase in the current output of the generator 1.

In the modification of Fig. 1 shown in Fig. 2, the field windings 6 and 7 are shown as shunt field windings instead of cross connected field windings, and the auxiliary windings 12 and 13 are compound windings, instead of differential windings. The connections of the controlling electrodes 20 and 21 are interchanged so that the electrode 20 is connected to the negative terminal of the commutating field winding 10 of the generator 1 and the electrode 21 is connected to the negative terminal of the commutating field winding 11 of the generator 2. The cathode 16 of the device 14 is connected between the positive terminal of the generator 1 and the negative terminal of the commutating field winding 11 of generator 2 and the cathode 17 of the device 15 is connected between the positive terminal of the generator 2 and the negative terminal of the commutating field winding 10 of generator 1.

The operation of the modification shown in Fig. 2 is as follows: So long as each generator is supplying its proper share of the total load, the voltage drop across the commutating field windings 10 and 11 are equal and therefore the cathode and controlling electrode of each device are at the same potential so that the current through the regulating field windings 12 and 13 are substantially the same.

If the load on the generator 1 increases with respect to the load on the generator 2, the voltage drop across the field winding 10 becomes greater than the voltage drop across the field winding 11. Consequently, the controlling electrode 21 of the device 15 becomes more positive with respect to its cathode 17 so that more current is transmitted through the device 15 and the field winding 13 which effects an increase in the current output of the generator 2. Also, the controlling electrode 20 of the device 14 becomes more negative with respect to its cathode 16 so that less current is transmitted through device 14 and the field winding 12, which effects a decrease in the current output of the generator 1.

If the load on the generator 2 increases with respect to the load on the generator 1, the voltage drop across the field winding 11 becomes greater than the voltage drop across the field winding 10. Consequently, the controlling electrode 20 of the device 14 becomes more positive with respect to its cathode 16, so that more current is transmitted through the device 14 and the field winding 12, which effects an increase in the current output of the generator 1. Also, the controlling electrode 21 of the device 15 becomes more negative with respect to its cathode 17, so that less current is transmitted through device 15 and the field winding 13, which effects a decrease in the current output of the generator 2.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:—

1. In combination, two sources of current connected in parallel, and means comprising an electron discharge device associated with one of said sources for controlling the current supplied by said source in accordance with a predetermined relation between the current outputs of the two sources.

2. In combination, two dynamo-electric machines connected in parallel, means for controlling the division of the load between said machines comprising an electron discharge device and means whereby said device controls the excitation of one of said machines in accordance with the difference between the loads on the two machines.

3. In combination, two dynamo-electric machines connected in parallel and means for controlling the division of the load between said machines comprising an electron discharge device for controlling the excitation of one of said machines, said device being provided with a cathode, and anode, and means associated with said device for controlling the transmission of current from the cathode to the anode thereof and arranged to control said transmission of current in accordance with the difference between the currents flowing through said machines.

4. In combination, two dynamo-electric machines connected in parallel and means for controlling the division of the load between said machines comprising an electron discharge device for controlling the excitation of one of said machines, said device being provided with a cathode, an anode and a controlling electrode so connected that the transmission of current through the device varies in accordance with the relative currents flowing through said machines.

5. In combination, two dynamo-electric machines connected in parallel, and means for controlling the division of the load between said machines comprising an electron discharge device associated with each machine for controlling the excitation thereof, each device comprising a cathode, anode and a controlling electrode connected to said machines to vary inversely the transmission of current through said devices with respect to each other in response to changes in the relative currents flowing through said machines.

6. In combination, two sources of current connected in parallel, an impedance connected in series with each source, and means for controlling the division of load between said sources comprising an electron discharge device for controlling the output of one of said sources, comprising a cathode connected so that voltage impressed thereon varies in accordance with the voltage drop across one of said impedances, an anode, and a controlling electrode connected so that the voltage impressed thereon varies in accordance with the voltage drop across the other one of said impedances.

7. In combination, two dynamo-electric machines connected in parallel, an impedance connected in series with each machine, and means for controlling the division of the load between said machines comprising an electron discharge device associated with each machine and arranged to control the excitation thereof, each device being provided with a cathode, an anode and a controlling electrode, one of said controlling electrodes and the cathode of the other device being connected so that the voltage impressed thereon varies in accordance with the voltage drop across one of said impedances, the other of said controlling electrodes and the other cathode being connected so that the voltage impressed thereon varies in accordance with the voltage drop across the other of said impedances.

8. In combination, two direct current generators connected in parallel and means for controlling the division of load between said machines comprising an electron discharge device associated with each generator for controlling the current in one of its field windings, each device being provided with a cathode and an anode which are connected in the circuit of the field winding with which it is associated and with a controlling electrode, the controlling electrode of one of said devices and the cathode of the other of said devices being connected so that the voltage impressed thereon varies in accordance with the voltage drop produced across one of the series field windings of one of said generators and the controlling electrode of the said other of said devices and the cathode of said one of said devices being connected so that the voltage impressed thereon varies in accordance with the voltage drop produced across one of the series field windings of the other of said generators.

In witness whereof, I have hereunto set my hand this 28th day of August, 1926.

GORDON R. McDONALD.